(12) United States Patent
Bøgh-Andersen

(10) Patent No.: US 6,833,910 B2
(45) Date of Patent: Dec. 21, 2004

(54) LASER TRANSPONDER

(76) Inventor: Torben Bøgh-Andersen, Jyllingevej 267, Rodovre (DK), DK-2610

( * ) Notice: Subject to any disclaimer, the term of this patent is extended or adjusted under 35 U.S.C. 154(b) by 0 days.

(21) Appl. No.: 10/138,036

(22) Filed: May 1, 2002

(65) Prior Publication Data
US 2003/0206286 A1 Nov. 6, 2003

(51) Int. Cl.[7] .............................. G01P 3/36; G01S 7/36
(52) U.S. Cl. ............................ 356/28; 356/28.5; 342/20
(58) Field of Search ...................... 356/28, 28.5; 342/20

(56) References Cited

U.S. PATENT DOCUMENTS 5,715,045 A * 2/1998 Dunne .......................... 356/28
5,767,954 A * 6/1998 Laakmann .................... 356/28
5,793,476 A * 8/1998 Laakmann et al. ........... 356/28
5,793,477 A * 8/1998 Laakmann .................... 356/28
6,297,732 B2 * 10/2001 Hsu et al. ..................... 342/20
6,469,653 B1 * 10/2002 Haynes ......................... 342/20

* cited by examiner

Primary Examiner—Stephen C. Buczinski
(74) Attorney, Agent, or Firm—Winston & Strawn LLP

(57) ABSTRACT

A laser transponder for disabling a laser-based speed monitor which is transmitting a monitor laser beam at a moving vehicle by transmitting a jamming laser beam to the laser-based speed monitor. The monitor laser beam is in the shape of a monitor signal that includes monitor pulse trains emitted at a first frequency, while the jamming laser beam is in the shape of a jamming signal that includes jamming pulse trains emitted at a second frequency.

21 Claims, 4 Drawing Sheets

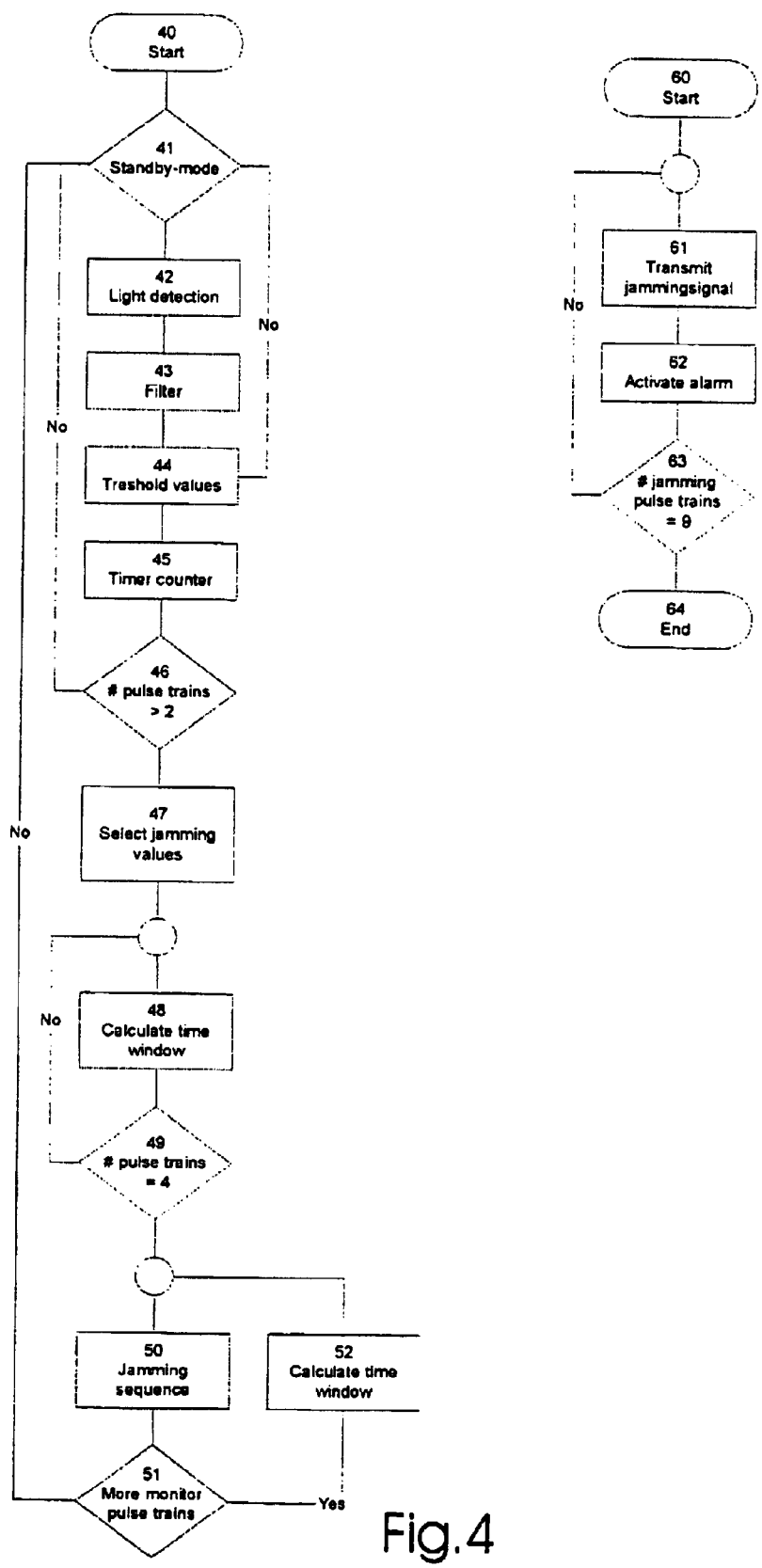
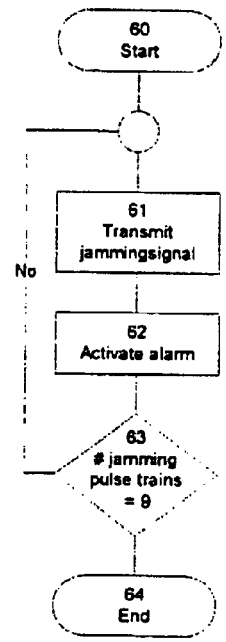
Fig.5
Fig.4

LASER TRANSPONDER

TECHNICAL FIELD

The present invention relates to a laser transponder for disabling a laser-based speed monitor, which is transmitting a monitor laser beam at a moving vehicle by transmitting a jamming laser beam to the laser-based speed monitor.

BACKGROUND ART

Laser transponders for optically receiving and emitting information are today widely used in the fields of communication, surveillance and other areas where exchange of information is of interest.

There is however a growing demand for processing the information with a higher reliability of the communication link.

However, the transmission speed, the amounts of data transmitted and the reliability of the link are all closely connected and an improvement in one parameter will reduce the performance of the two others. Further the growing demand for yet smaller electronic circuitry adds even another factor to take into account, since smaller systems creates larger thermal problems.

U.S. Pat. Nos. 5,767,954 and 5,793,477 both describe a system for disabling a laser-based speed monitor. These systems receive and recognize an optical signal from a speed monitor after which they transmit a fixed high-energy signal to disable the speed monitor. However when triggered by a signal from a speed monitor these systems will respond with a high energy signal, covering a wide band of possible frequencies, which will risk overheating the laser diode if not disabled for a period of time afterward, rendering the systems useless for that period.

Moreover, the laser-based speed monitor can easily recognize this type of laser jamming transponders, and thus alerting the user of the speed monitor that this is being jammed. Thus, improvements in these type devices are needed.

SUMMARY OF THE INVENTION

A first aspect of the invention is therefore to provide a new and improved laser transponder and method for responding to a received signal capable of working continuously and reliably without overheating the components.

A second aspect of the invention is to provide a laser transponder and a method, which quickly and reliably will transmit the necessary information.

A third aspect of the invention is to provide a laser transponder and a method, which will make use of laser diodes instead of commonly, used IR-diodes.

A fourth aspect of the invention is to provide a laser transponder and a method, which will not be detected by a laser-based speed monitor as a jamming device.

A novel and peculiar feature of the invention includes that the jamming laser beam is in the shape of a jamming signal consisting of jamming pulse trains emitted with a second frequency, where the monitor laser beam is in the shape of a monitor signal consisting of monitor pulse trains emitted with a first frequency.

In an advantageous embodiment of the invention the laser transponder comprises a microprocessor having stored in a database reference values for the first frequency of at least some of a number of known monitor signals, and for each of those reference values also having stored a corresponding value for the second frequency of the jamming signal; an optical receiver for receiving the monitor signal; a monitor signal converter for converting the monitor signal to an electrical monitor signal and sending the signal as input to the microprocessor; a program of the microprocessor for comparing the received electrical monitor signal with the reference values of the database, selecting the corresponding second frequency, or if no reference values is found selecting the first frequency as the second frequency, and generating an electric jamming signal with the selected frequency; a jamming signal converter for receiving the electrical jamming signal from the microprocessor and converting it to the jamming signal; and an optical transmitter for transmitting the jamming signal to the laser-based speed monitor.

The program can also comprise a method wherein the jamming pulse train is emitted in a specific time frame corresponding to a time frame where the laser-based speed monitor expects to receive the reflection of its monitor pulse train.

Further the program can also comprise a method to emit the jamming pulse train such that it is in phase with the monitor pulse train.

Prior uses of laser diodes were limited to very short operating times since the emitted jamming pulse train by earlier methods emitted information in the entire frequency band of all known laser-based speed monitors, thereby emitting a very high energy signal that would overheat laser diodes that were operated continuously.

Furthermore, the emitted high energy jamming pulse train is easily recognized by the laser-based speed monitor as a jamming signal and would thereby alert the user of the laser-based speed monitor accordingly.

Therefore it is also seen in many other applications that IR-diodes have been used. These have the advantage that they work at very low energies and thereby do not overheat. However, such IR-diodes emit a maximum energy at 850 nm and at the operating wavelength of common laser emitting and laser receiving devices, which is at 905 nm, they only emit 20% of the energy emitted at 850 nm, which creates the need for several IR-diodes where you only need one laser diode.

Yet another advantage of making it possible to have the laser diode to work continuously is that it can work with much higher energies than an IR-diode. Typically, an IR-diode emits light with 100 mW where common laser diodes can emit up to 50W and thereby creating a much higher reliability of the communication link.

Accordingly, the invention provides a laser transponder and method that can recognize a laser-based speed monitor and generate a signal that contains enough information to jam the specific speed monitor, thereby avoiding large energy signals and making it possible to use a laser diode continuously and in a way that prevents the laser transponder to be detected by the laser-based speed monitor and without overheating the laser diode.

BRIEF DESCRIPTION OF THE DRAWINGS

The invention will be explained in greater detail below, describing a preferred embodiment with reference to the drawings, in which FIG. 4 shows a flowchart of the method to process the signal in a microprocessor, and FIG. 5 shows a flowchart of the jamming sequence in the method described in FIG. 4.

DETAILED DESCRIPTION OF THE PREFERRED EMBODIMENTS

Figure 1:
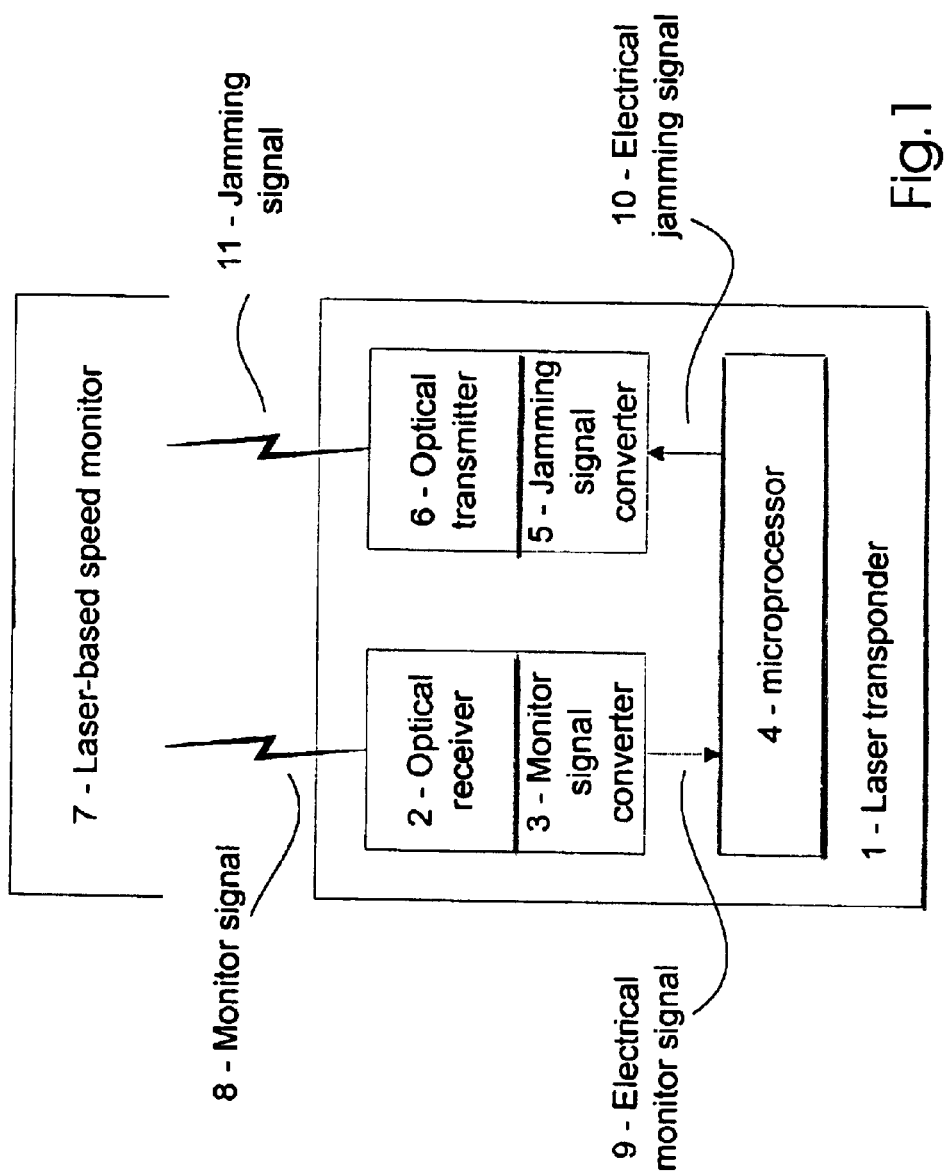
FIG. 1 shows a block diagram of a laser transponder according to the invention.

As shown in FIG. 1, a laser transponder 1 in accordance with the invention comprises an optical receiver 2, a monitor signal converter 3, a microprocessor 4, a jamming signal converter 5 and an optical transmitter 6.

The optical transmitter 6 is in one embodiment a laser diode having typically a wavelength of 904–905 nm, and is in another embodiment an IR diode with a typical wavelength of 870 nm.

The microprocessor 4 stores in a database reference values for the frequency of at least some of a number of known monitor signals, and for each of these reference values also stores a corresponding value for another frequency of the jamming signal. In one embodiment these reference values are changeable.

During operation, a laser-based speed monitor 7 transmits a monitor laser signal 8, which is received by the optical receiver 2. The optical receiver transmits the monitor laser signal to the monitor signal converter 3, which in turn converts this signal into an electrical monitor signal 9, which is then transmitted to the microprocessor 4.

The microprocessor includes a program for comparing the received electrical monitor signal with the reference values of the database, and selecting the corresponding second frequency or, if no reference value is found, selecting the first frequency as the second frequency.

The microprocessor processes the electrical monitor signal into an electric jamming signal 10 with the selected second frequency and transmits this signal to the jamming signal converter 5 which converts the electric jamming signal into a jamming laser signal 11, which is transmitted back to the laser-based speed monitor by means of the optical transmitter 6.

Figure 2:
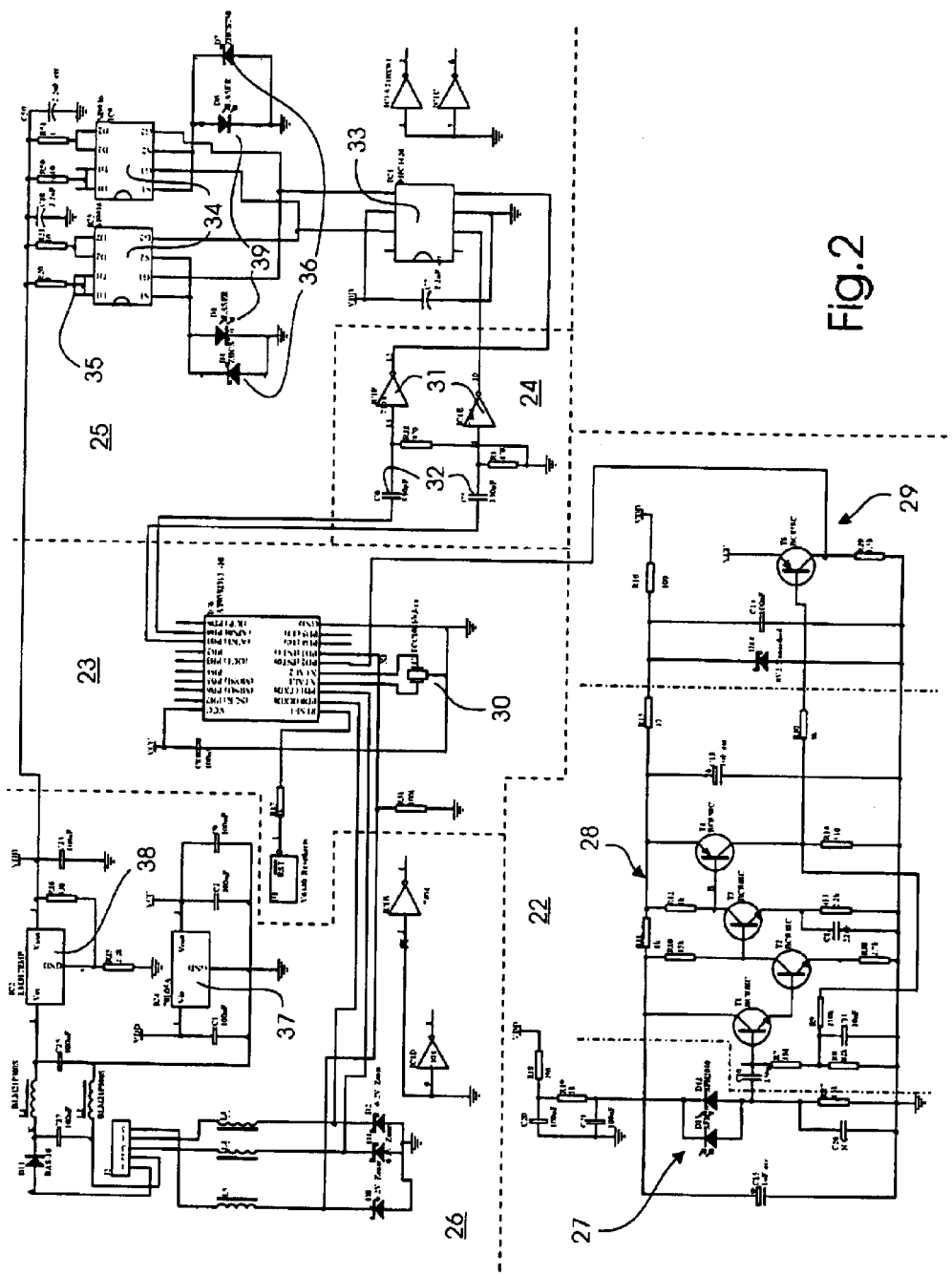
FIG. 2 shows a detailed circuitry of the hardware of a preferred embodiment of an apparatus according to the invention.

FIG. 2 shows the detailed circuitry 21 for a preferred embodiment of the laser transponder according to the invention. The circuitry comprises five subcircuits, an IR photo diode detector circuit 22, a microprocessor circuit 23, a jamming pulse width limiter circuit 24, a laser diode circuit 25 and a voltage regulator circuit 26.

The IR photo diode detector circuit preferably comprises two parallel-coupled IR photodiodes 27 in a classic transistor amplifier configuration 28 known in the art with a negative feedback to avoid oscillation and temperature drift. The amplifier has a high gain (>50 dB) and amplifies the ac coupled electrical monitor signal coming from the two photo diodes.

In the shown embodiment, two diodes are selected for use to increase the sensitivity of the detector.

The signal is then transmitted through a one-transistor smitt trigger stage 29 to ensure that the microprocessor receives a binary signal.

The microprocessor 23 is preferably an 8 Bit Flash microcontroller. The microprocessor is a twenty pin CPU where eleven pins are used in the described embodiment of the invention. The GND pin and VCC pin connects the processor to the voltage regulator 26 to supply the processor during operation.

Interrupt and input pin PD2 is connected to the IR photo diode detector circuitry and voltage regulator respectively.

Pins XTAL1 and XTAL2 are connected with an external 10 MHz oscillator 30, which functions as the clock for the microprocessor. Input and interrupt pin PD3, input pin PD0 and output pin PD1 are all connected to the voltage regulator. The RESET pin is connected to a simple reset circuitry well known in the art and is used for resetting the microprocessor. PB0 and PB1 are both output pins connected to the laser diode circuitry via the pulse width limiter 24.

The monitor signal from the IR photo diode detector circuitry will via the interrupt pin PD2 trigger a signal-processing program of the microprocessor.

When the signal processing program have processed the monitor signals it will output an electrical jamming signal on both output pins PB0 and PB1 which are connected to the pulse width limiter 24.

The jamming pulse width limiter is basically a differentiator as known in the art. It is connected to the pins PB0 and PB1 and includes a buffer amplifier 31 and a capacitor 32, which limits the pulse width of the laser pulse in order not to overload laser diodes 39. In the described embodiment, the pulse width is limited to a maximum of 150 nS.

Thereby, a very high peak power can be obtained resulting in a very effective jamming at long ranges without overloading the laser diode.

The laser diode driver 25 consists of two stages. The first stage consists of two FETs in an IC 33 driving the laser diodes driver FETs in two preferably identical ICs 34.

To protect the laser diodes when they are cold and thereby have a slow start function, the CPU powers up the laser diodes at a lower current for the first four pulses. This is realized by providing one of the two drivers 34 with a series resistor 35 that limits current.

The laser diodes are further protected by free wheel diodes 36 preventing any current to flow backwards into the laser diodes.

The voltage regulator circuit 26 is a circuit well known in the art and comprises two voltage regulators 37; 38. The first voltage regulator 37 is a 3-Terminal Positive Regulator from National Semiconductor and functions to supply all the digital IC's with a voltage of 5-volt VCC. The second voltage regulator 38 is a 3-Terminal Adjustable Regulator also from National Semiconductor, and it functions to adjust the main power supply voltage VDD that supplies the rest of the circuit including the laser diodes.

Figure 3:
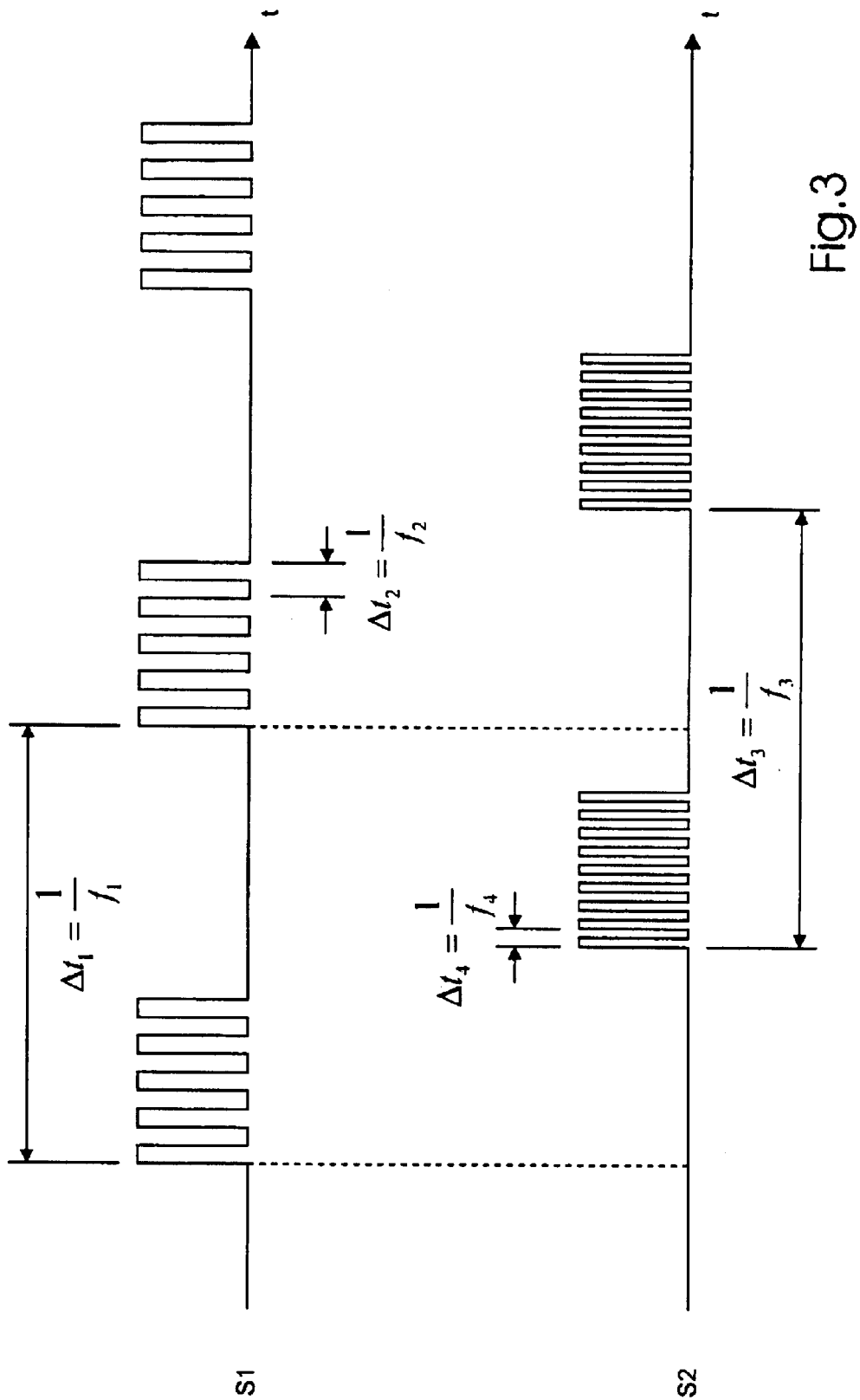
FIG. 3 illustrates a received and transmitted signal.

FIG. 3 shows an example of the monitor signal S1 and jamming signal S2 of the preferred embodiment of the invention.

The monitor signal has a signal frequency $f_1$ and comprises of pulse trains each with a number of pulses and a pulse train frequency $f_2$.

The jamming signal have a signal frequency $f_3$ and comprises of pulse trains each with the same or another number of pulses and a pulse train frequency $f_4$, which in FIG. 3 is higher than $f_2$.

A time window is indicated by the two dotted lines and is having a time frame equal to that of $\Delta t_1$. This time window indicates the time frame in which the pulse train in the jamming signal must be transmitted in order to be sure that the laser-based speed monitor is registering said pulse train within said time frame as expected by the laser-based speed monitor, which therefore interprets the received pulse train as an reflection of the transmitted monitor pulse train.

In an advantageous embodiment, the jamming signal is transmitted in phase with the monitor pulse train, thereby securing that each jamming pulse train will be received within the expected time frame.

In FIG. 4 a flowchart describes the course of the program of the microprocessor and how the electronic monitor signal is processed.

At start up 40 the program goes to standby-mode 41. Here it will idle until light detection 42 occurs, which will result in an electrical signal on the input pin PD2 which is an interrupt pin that triggers the program.

Afterwards the received signal will be processed in a filter system 43. In the present embodiment, this system includes two filters, a direct hit filter and a bandpass filter.

The direct hit filter is a filter that is implemented to prevent the microprocessor to respond faulty due to saturation of the IR photo diode by a direct hit on the diode by the monitor laser beam. To prevent a faulty response the direct hit filter can in case the IR photo diode is saturated block the input terminal on the microprocessor for a period of time, e.g. 1 ms.

After passing the direct hit filter the signal passes through a bandpass filter that has a frequency band that is set from 70 Hz to 700 Hz such that frequencies from 100 Hz to 600 Hz can pass, e.g., those frequencies at which known laser monitor equipment operates.

To improve the performance of the program and prevent unnecessary data to be processed as well as to improve the effectiveness of the laser transponder, the electrical monitor signals are compared against a number of threshold values 44, which is a set of values that define the boundaries for the program in order to recognize the received signal as a genuine monitor signal.

Such threshold values in the shown embodiment are pulse risetime, light intensity, but it shall be understood that many other threshold values could be added. Further a flimmer window is also activated at this time in the program which also serves to eliminate unwanted processing of unwanted signals.

The flimmer window is implemented to prevent the software to falsely detect new signals due to noise on the rising flank on a pulse in the same pulse train in an already detected signal. This is realized by configuring the software to not detect any new signals in the flimmer window timeframe, which in the shown embodiment can be set to 50–100 ms from when the first pulse was detected.

If the signal is outside the defined threshold values the program will return to its standby-mode 41 and wait for another light detection. If the signal is within the defined threshold values the program will start a timer counter 45 which will time the interval between pulse trains and also count the number of pulse trains received.

The program of the microprocessor includes calculating the expected time for receiving the next of x monitor pulse trains, sending the next jamming pulse train to the monitor signal converter at the expected time, and checking at the time, where the monitor pulse train number y is expected, if the laser-speed monitor still is transmitting and, if this is the case, sending a jamming pulse train to the monitor signal converter at the time where the monitor pulse train number y+1 is expected, where x in one embodiment is 5 and y is 9.

In step 46, the program will control to see if it has detected three pulse trains in a given time frame. If the number of pulse trains is under three the program will return to standby-mode and await a new pulse train while the timer is running.

If the program detects that three relevant pulse trains have been detected in an accepted time set by the timer counter 45, the program will proceed to step 47, where it based on the received signal will select corresponding values for a jamming signal and a time window where it will transmit the generated jamming signal.

This is realized in the described embodiment by two different methods. The first method is by a table look-up where different frequencies of the signal and pulse trains correspond to different user defined jamming signals. This will mainly be the case when a monitor signal is received from a known laser-based speed monitor.

The second method is used when a monitor signal is received and there is no corresponding jamming signal in the table. In other words the monitor signal is transmitted from an unknown laser-based speed monitor. In this case, the program will select a user defined jamming signal. In the shown embodiment, this is the first jamming signal in a table of the database of the microprocessor, but transmitted with the same signal frequency as the received monitor signal.

By selecting a specific signal frequency for jamming the laser-based speed monitor, as is done above, the transmission of a continuous jamming signal with a pulse frequency of 5 MHz is avoided, but instead transmission is made of a jamming signal comprising pulse trains where each pulse train have a frequency which could be e.g. 5 MHz, and the signal frequency is set in an interval of known laser based speed monitors which is between 100 Hz and 600 Hz.

By avoiding a high energy signal that emits 5 MHz continuous pulses, as described above, the generation of a lot of heat in the optical emitter is avoided, and the energy savings can be used to transmit higher powered pulses in the pulse trains or to transmit jamming signals for longer periods of time, thereby improving the functionality of the laser transponder.

Further it is also possible for the user to adjust the values in the software such as the signal frequency of the jamming signal or the pulse train frequency or the number of pulses in a train, thereby being able to fine-tune the laser transponder to suit the user's specific needs.

The microprocessor is programmed for registration of the time elapsed between receiving successive monitor pulse train, calculating, based on such registrations, the time for receiving the next monitor pulse train, and generating an electrical jamming signal representing the jamming pulse trains, which is to be transmitted at that time.

In step 48 the time window is calculated in which the jamming signal is to be emitted in order to make sure that the laser-based speed monitor receives the jamming signal at the time where it expects to receive the reflection of its monitor signal. This time window is calculated based on a mean value of the time difference between the present and previous pulse train as is shown by the dotted lines in FIG. 3 and the number of pulse trains that have passed.

To make sure that the time window is correctly calculated in the described embodiment the program will in step 49 first continue processing after the program have calculated the mean value for the time window over four pulse trains.

After calculating the time window the program will start a jamming sequence in step 50. The jamming sequence will be described in more detail below with reference to FIG. 5.

When the program have completed the jamming sequence it will proceed to step 51 to see if the system still is receiving pulse trains. If it is, it will go to step 52 where it will calculate a new time window based on previous time windows in the same way as described in step 48 and thereafter it will return to step 50 and repeat the jamming sequence.

In one embodiment, the microprocessor is programmed for checking, for e.g. every five expected monitor pulse trains, if the laser-speed monitor still is transmitting in step 51 and, if this is the case, sending jamming pulse train to the jamming signal converter when receiving the monitor pulse train number six.

If no more monitor signals are detected the program will return to standby-mode in step 41 where it will await the next light detection.

The jamming sequence in FIG. 4 is described in more detail in FIG. 5. When the jamming sequence is started in step 60 the program will output the selected jamming signal in step 61.

After transmitting the signal the program will activate an alarm 62 which will alert the user that he or she is being monitored, typically when the monitor pulse train has been received more than a predetermined number of times.

The alarm in the described embodiment includes both an audio alert and a visual alert. The audio alert can be a small buzzer, which will buzz when activated, while the visual alert can be a diode that will emit a light when activated. The two alerts can either be activated simultaneously or the user can chose to only use either one or neither one.

In step 63, the program will pull the timer and ask how many pulses trains have passed. If less than nine pulse trains have been detected, the program will return to step 61 and continue emitting the jamming signal and keeping the alarm activated. If nine pulse trains have passed, the program will end the jamming sequence 64, turn off the alarm and return to step 51 in FIG. 4.

What is claimed is:

1. A laser transponder for disabling a laser-based speed monitor which is transmitting a monitor laser beam at a moving vehicle by transmitting a jamming laser beam to the laser-based speed monitor, whereby the monitor laser beam is in the shape of a monitor signal that includes monitor pulse trains emitted with a first frequency, and the jamming laser beam is in the shape of a jamming signal that includes jamming pulse trains emitted with a second frequency and a microprocessor programmed for:
   registering times elapsed between receiving successive monitor pulse trains,
   calculating, based on the registered times, times for receiving the next monitor pulse train, and
   generating electrical jamming signals representing the jamming pulse trains which are to be transmitted at the calculated times.

2. The laser transponder of claim 1, further comprising:
   a database operatively connected to the microprocessor and having stored reference values for the first frequency of at least some of a number of known monitor signals, and for each of the reference values also having stored in the database a corresponding value for the second frequency of the jamming signal,
   an optical receiver for receiving the monitor signal,
   an monitor signal converter for converting the monitor signal to an electrical monitor signal and sending the signal as input to the microprocessor,
   a program of the microprocessor for comparing the received electrical monitor signal with the reference values of the database, selecting the corresponding second frequency, or if no reference values are found selecting the first frequency as the second frequency, and generating an electric jamming signal with the selected frequency,
   a jamming signal converter for receiving said electrical jamming signal from the microprocessor and converting it to the jamming signal, and
   an optical transmitter for transmitting said jamming signal to the laser-based speed monitor.

3. The laser transponder of claim 1, wherein the jamming signal has a different frequency than the monitor signal.

4. The laser transponder of claim 1, wherein the jamming pulse trains are transmitted with a higher frequency than the monitor pulse train.

5. The laser transponder of claim 1, wherein the jamming signal is transmitted in phase with the monitor signal.

6. The laser transponder of claim 1, wherein the microprocessor is programmed for:
   calculating an expected time for receiving the next x monitor pulse trains,
   sending a next jamming pulse train to the monitor signal converter at the expected time, and
   checking at that time, where the monitor pulse train number y is expected, if the laser-speed monitor still is transmitting and, if this is the case, sending a jamming pulse train to the monitor signal converter at the time where the monitor pulse train number y+1 is expected.

7. The laser transponder of claim 6, wherein x=5 and y=9.

8. The laser transponder of claim 6, wherein the microprocessor is programmed for checking, for every five expected monitor pulse trains, if the laser-speed monitor still is transmitting and, if this is the case, sending jamming pulse train to the monitor signal converter when receiving the monitor pulse train number six.

9. The laser transponder of claim 2, wherein the optical transmitter is a laser diode having a typical wavelength of 904–905 nm.

10. The laser transponder of claim 2, wherein the optical transmitter is an IR diode having a typical wavelength of 870 nm.

11. The laser transponder of claim 1, further comprising a sound alarm adapted for activation if a monitor pulse train has been received more than a predetermined number of times.

12. The laser transponder of claim 2, wherein the database is adapted in such way that the stored values are changeable.

13. A laser transponder for disabling a laser-based speed monitor which is transmitting a monitor laser beam at a moving vehicle by transmitting a jamming laser beam to the laser-based speed monitor, whereby the monitor laser beam is in the shape of a monitor signal that includes monitor pulse trains emitted with a first frequency, and the transponder includes a microprocessor for generating the jamming laser beam in the shape of a jamming signal that includes jamming pulse trains emitted with a second frequency, and an optical transmitter for transmitting the jamming signal to the laser-based speed monitor in phase with the monitor signal.

14. The laser transponder of claim 13, wherein the microprocessor is programmed for:
   registering time elapsed between receiving successive monitor pulse trains,
   calculating, based on the registrations, the time for receiving the next monitor pulse train, and
   generating the jamming signal representing the jamming pulse trains, which is to be transmitted at that time.

15. The laser transponder of claim 14, wherein the microprocessor is programmed for:
   calculating an expected time for receiving the next x monitor pulse trains,
   sending the next jamming pulse train to the monitor signal converter at the expected time, and
   checking at the time, where y monitor pulse trains are expected, if the laser-speed monitor still is transmitting and, if this is the case, sending a jamming pulse train to the monitor signal converter at the time where the monitor pulse train no. y+1 is expected.

16. The laser transponder of claim 15, wherein the microprocessor is programmed for checking, for every five expected monitor pulse train, if the laser-speed monitor still is transmitting and, if this is the case, sending jamming pulse train to the monitor signal converter when receiving the monitor pulse train number six.

17. The laser transponder of claim 13, further comprising a sound alarm adapted for activation if a monitor pulse train has been received more than a predetermined number of times.

18. The laser transponder of claim 13 wherein the microprocessor is operatively associated with a database having stored reference values for the first frequency of at least some of a number of known monitor signals, and for each of the reference values, also having stored in the database a corresponding value for the second frequency of the jamming signal, and further that is adapted in such way that the stored values are changeable.

19. A laser transponder for disabling a laser-based speed monitor which is transmitting a monitor laser beam at a moving vehicle by transmitting a jamming laser beam to the laser-based speed monitor, whereby the monitor laser beam is in the shape of a monitor signal that includes monitor pulse trains emitted with a first frequency, and the jamming laser beam is in the shape of a jamming signal that includes jamming pulse trains emitted with a second frequency, a microprocessor with a program adapted for registering times elapsed between receiving successive monitor pulse trains, and calculating, based on the registered times, a time for receiving the next monitor pulse train.

20. A method for disabling a laser-based speed monitor which is transmitting a monitor laser beam in the shape of a monitor signal having a first frequency, which comprises having the laser-based speed monitor transmit a jamming laser beam in the shape of a jamming signal having a second frequency and storing in a database of a microprocessor reference values for the first frequency of at least some of a number of known monitor signals, and for each of such reference values also storing corresponding values for the second frequency of the jamming signal.

21. The method of claim 20, further comprising:

receiving the monitor signal by means of an optical receiver, converting by means of an monitor signal converter the monitor signal to an electrical monitor signal and sending the monitor signal as input to the microprocessor, comparing by means of a program of the microprocessor the received electrical monitor signal with the reference values of the database, selecting the corresponding second frequency, or if no reference values is found selecting the first frequency as the second frequency, and generating an electric jamming signal with the selected frequency, converting by means of a jamming signal converter said electrical jamming signal to the jamming signal, and transmitting by means of an optical transmitter the jamming signal to the laser-based speed monitor.

\* \* \* \* \*